United States Patent

Sindzingre et al.

[11] Patent Number: 6,146,503
[45] Date of Patent: Nov. 14, 2000

[54] METHOD AND APPARATUS FOR DRY SURFACE TREATMENT OF AN OBJECT

[75] Inventors: Thierry Sindzingre, Cachan; Stéphane Rabia, Gif sur Yvette, both of France

[73] Assignee: L'Air Liquide Société Anonyme pour l'Etude et l'Exploitation des Procedes Georges Claude, Paris Cedex, France

[21] Appl. No.: 09/147,463

[22] PCT Filed: Jun. 10, 1997

[86] PCT No.: PCT/FR97/01027

§ 371 Date: Jan. 4, 1999

§ 102(e) Date: Jan. 4, 1999

[87] PCT Pub. No.: WO98/00284

PCT Pub. Date: Jan. 8, 1998

[30] Foreign Application Priority Data

Jul. 2, 1996 [FR] France ................................ 96 08230

[51] Int. Cl.[7] ...................................................... H05F 3/00
[52] U.S. Cl. ............... 204/164; 422/186.04; 422/186.05; 264/83; 264/446; 264/483
[58] Field of Search ............... 204/164, 186.04, 204/186.05, 186.18, 186.07, 186.14; 34/379, 423, 477; 264/83, 446, 483

[56] References Cited

U.S. PATENT DOCUMENTS

| | | |
|---|---|---|
| 3,484,363 | 12/1969 | Williams . |
| 4,946,568 | 8/1990 | Kalwar et al. . |
| 5,458,856 | 10/1995 | Marie et al. .............. 422/186 |
| 5,484,560 | 1/1996 | Moriyama et al. ..................... 264/483 |
| 5,667,563 | 9/1997 | Silva, Jr. ..................... 96/50 |
| 5,858,312 | 1/1999 | Sindzingre et al. .............. 422/186.04 |

FOREIGN PATENT DOCUMENTS

| | | |
|---|---|---|
| 606014 | 7/1994 | European Pat. Off. . |
| 1421884 | 11/1965 | France . |
| 2692730 | 12/1993 | France . |
| 2711680 | 5/1995 | France . |
| 3619694 | 12/1987 | Germany . |

OTHER PUBLICATIONS

Copy of EP Search Report No. PCT/FR97/01027 dated Sep. 9, 1997.

*Primary Examiner*—Kathryn Gorgos
*Assistant Examiner*—Wesley A. Nicolas
*Attorney, Agent, or Firm*—Nixon Peabody LLP

[57] ABSTRACT

In this process for dry surface treatment of at least one surface portion of an object, a gas is passed through an instrument for forming excited or unstable gas species, and said surface portion is brought in front of the outlet of said device with a view to treating it with said excited or unstable gas species, the secondary gas delivered as outlet from the instrument being subsequently taken in again by the Venturi effect and reinjected into the instrument.

17 Claims, 3 Drawing Sheets

METHOD AND APPARATUS FOR DRY SURFACE TREATMENT OF AN OBJECT

BACKGROUND OF THE INVENTION

1. Field of the Invention

The present invention relates to a process for dry surface treatment of at least one surface portion of an object, and more particularly concerns the surface treatment of polymer articles, for example to modify their wettability.

2. Description of the Related Art

With regard to the example of polymers, it is known that a polymer surface does not wet in contact with water. Instead, water forms droplets rather than a continuous film when in contact with such a surface.

Under certain circumstances or for certain applications, it is nevertheless desirable to provide polymer surfaces which can be wet with water or, in general, with a fluid (for example an ink or a paint).

The most widespread process for treating such polymer surfaces consists of the so-called "corona discharge" treatment. Such a process makes it possible to modify the wettability of a polymer surface at relatively low cost, and is already used very widely on an industrial scale.

However, there are a number of drawbacks with such a process, in particular because of the fact that it is only suitable for the treatment of thin polymer films and that it is therefore incapable of treating polymer surfaces of large articles and, in general, three-dimensional articles (in particular, the great difficulties encountered, for example, in adapting to the treatment of automobile body parts will be understood).

The Applicant Company recently proposed, in document EP-A-370870, a process for dry fluxing of a metal surface before soldering or tinning using an alloy, which is noteworthy in that the surface to be fluxed is treated, at a pressure close to atmospheric pressure, with a treatment gas atmosphere which comprises excited or unstable species and is substantially free of electrically charged species, and is obtained from a gas mixture delivered at the gas outlet of an instrument for forming excited or unstable gas species.

In this document, this process is more particularly exemplified and illustrated with the aid of a particular instrument for forming excited or unstable gas molecules, operating substantially at atmospheric pressure, which is described in the document FR-A-2,692,730 in the name of the Applicant Company.

This work has undeniably given an advantageous first response to the question of the limitation of objects which can be treated in volume.

SUMMARY AND OBJECT OF THE INVENTION

The object of the present invention is to overcome the drawbacks which have already been pointed out, and to provide a process and a device for surface treatment of objects which can further have relatively low gas consumption so that it can be compatible with use on an industrial scale for large numbers of objects to be treated.

It therefore relates to a process for dry surface treatment of at least one surface portion of an object, according to which a primary gas is passed through at least one instrument for forming excited or unstable gas species, and the surface portion is brought in front of the gas outlet of the instrument with a view to treating it with a secondary gas which is delivered to the gas outlet, and contains excited or unstable gas species and is one wherein the secondary gas delivered through the outlet of the instrument and used for the treatment is taken in again by the Venturi effect and reinjected into the instrument.

The process according to the invention may further have one or more of the following characteristics:

- the secondary gas delivered to the gas outlet is substantially free of electrically charged species;
- the secondary gas is at a pressure close to atmospheric pressure. According to the invention, the term "pressure close to atmospheric pressure" is intended to mean a pressure lying in the range from $0.1 \times 10^5$ Pa to $3 \times 10^5$ Pa;
- the primary gas includes at least one gas selected from inert gases, oxidizing gases and reducing gases;
- the surface to be treated is made of a polymer;
- the surface of the object to be treated is brought in front of the gas outlet of the instrument, where appropriate in front of the gas outlets of a plurality of instruments for forming excited or unstable gas species which are arranged in parallel over the width of the object and/or successively in front of the gas outlets of a plurality of instruments for forming excited or unstable gas species which are arranged in series, by means of a conveyor system which passes through an internal space defined by an enclosure, the enclosure being connected in leaktight fashion to the instrument or instruments or including the instrument or instruments.

The invention also relates to a device for dry treatment of at least one surface portion of an object, having at least one instrument which is intended to form excited or unstable gas species and comprises a gas inlet passage in communication with a primary gas supply source and an outlet passage for excited secondary gas including excited or unstable species, and an enclosure which defines an internal space and is connected in leaktight fashion to the instrument or instruments or includes the instrument or instruments, the gas outlet passage opening into the interior of the enclosure, and which device has, at at least one of the instruments:

- a Venturi-effect constriction arranged on the path of the gas between the primary gas supply source and the inlet passage, and
- a gas recirculation channel which connects the interior space of the enclosure to a zone located downstream of said constriction in order to make it possible, under the effect of the primary gas delivered by the primary gas supply source, to take in gas located in the enclosure by the Venturi effect in order to reinject it into the instrument in question for forming excited or unstable gas species.

According to a particular embodiment, the device has a system for conveying the object inside the internal space bounded by the enclosure, which can bring the surface to be treated in front of the gas outlet passage of the instrument.

According to another embodiment of the invention, the instrument for forming excited or unstable gas species has, connected to a high-frequency AC high-voltage source, an inner first exciting electrode of cylindrical shape, and an outer second exciting electrode which is of cylindrical shape and is provided with substantially opposite longitudinal slots which form the gas inlet and outlet passages, the first and second electrodes being arranged coaxially and bounding a gas excitation chamber, a layer of a dielectric being arranged on the surface of at least one of the electrodes, facing the other electrode.

Other features and advantages will emerge from the following description, which is provided solely by way of example and is given with reference to the appended drawings,

DETAILED DESCRIPTION OF PREFERRED EMBODIMENTS

Figure 1:
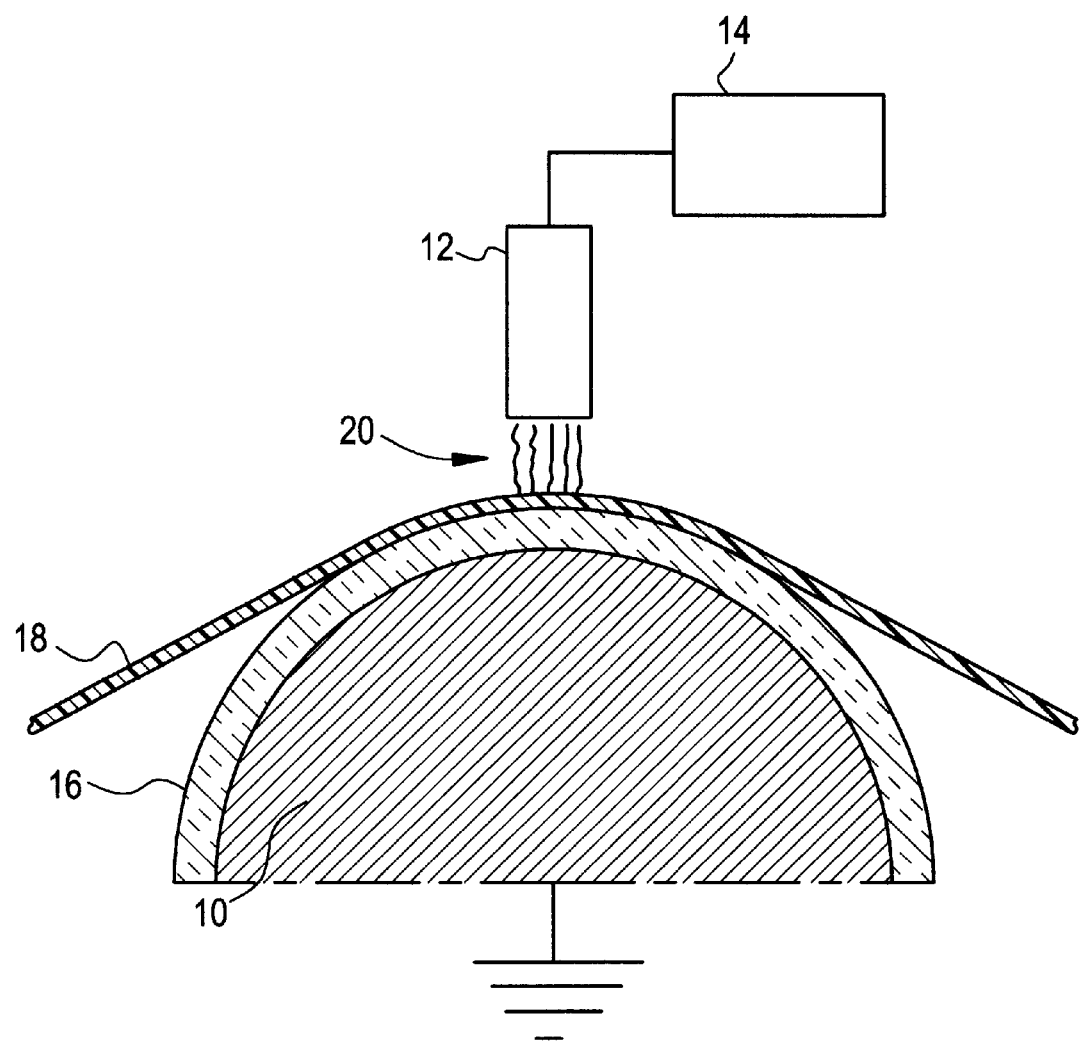
FIG. 1 is a schematic cross-sectional view of a surface treatment device according to the prior art.

FIG. 1 represents a device for surface treatment of polymer films by corona discharge.

This surface treatment device has a first metal electrode 10 artificially shortened in this FIG. 1, which is of cylindrical overall shape and is grounded, and a second metal electrode 12 which is of parallelepipedal cross section, extends parallel to the axis of the first electrode 10 and is connected to a high-frequency AC high-voltage source denoted by the numerical reference 14.

The first electrode 10 is coated with a layer of dielectric 16, for example a layer of ceramic, over which a polymer film 18 to be treated runs.

This FIG. 1 shows that the second metal electrode 12 is arranged in front of the contact zone between the polymer film 18 and the dielectric layer 16, and is separated from the first electrode 10 by an inter-electrode space of the order of a few millimeters.

This device is supplemented by a supply source (not shown) of treatment gas mixture which is designed to deliver the treatment gas (most often air) into the inter-electrode zone 20.

During operation, the electrodes 10 and 12 which have a potential difference between them cause a discharge in the gas with a view to forming excited or unstable chemical species (in particular electrically charged species) which are suitable for surface treating the film 18 with a view to modifying its wettability.

As has been mentioned above, such a device effectively treats the surface of a polymer film but, because of the necessarily short distance between the two metal electrodes 10 and 12, is not suitable for treating the surface of articles with large volume.

Figure 2:
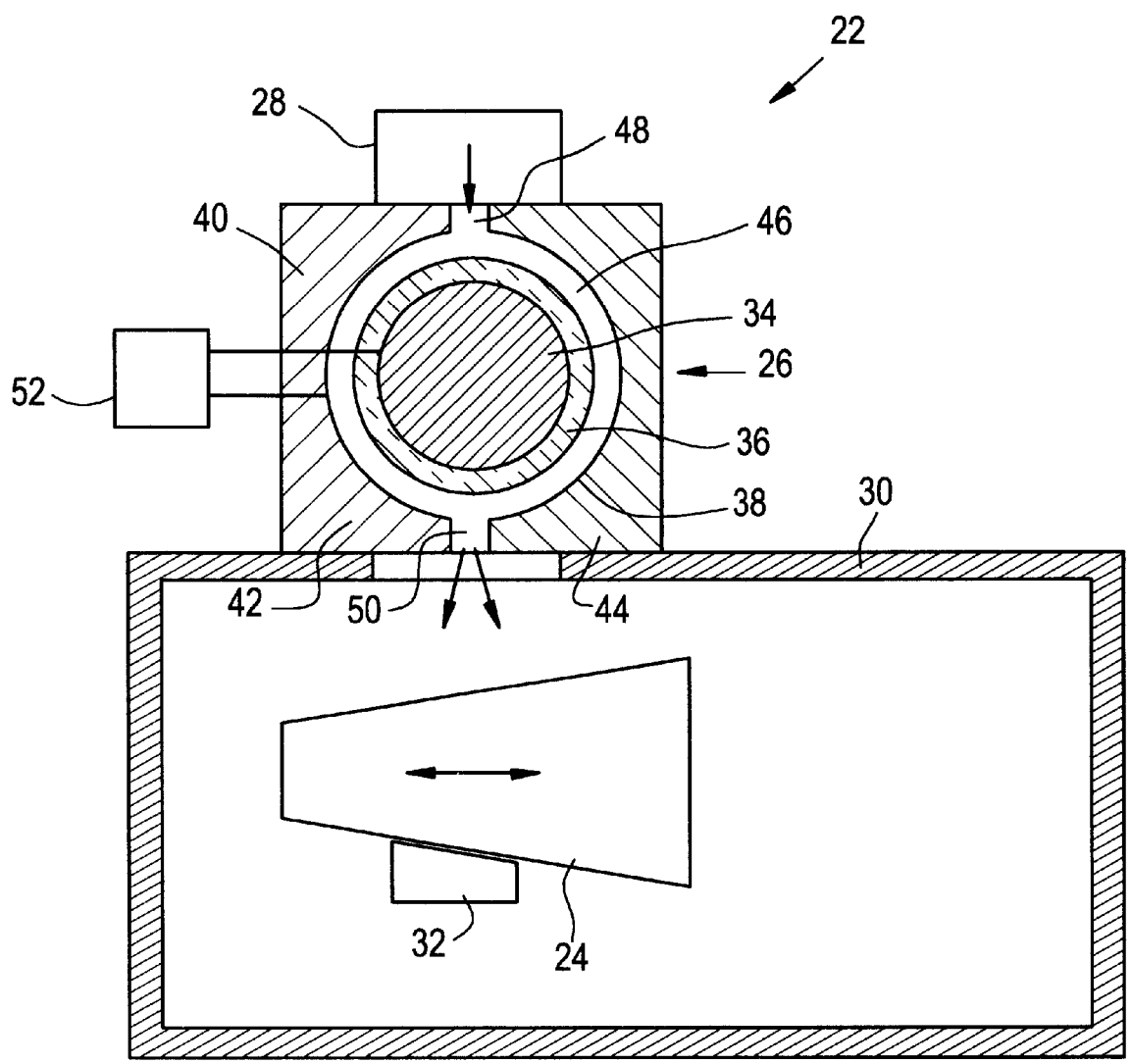
FIG. 2 is a schematic cross-sectional view of a surface treatment device according to the invention, in simplified representation without a Venturi-effect constriction.

FIG. 2 represents a surface treatment device which makes it possible to overcome this drawback and is denoted by the general numerical reference 22.

The device in FIG. 2 has a simplified configuration without a Venturi-effect constriction, offering a clear view of the various gases involved in the treatment.

This device is illustrated here in the case of treating the surface of a cup 24 made of polymer with a view to modifying its wettability.

This FIG. 2 shows that the treatment device 22 has an instrument 26 which is intended to form excited or unstable gas species and is supplied with primary gas by a primary gas supply source 28 and is in communication with an enclosure 30 in which a conveyor system 32 (represented very schematically) is arranged, this conveyor system 32 being suitable for moving the object/cup 24 so as to present all its surface in front of the gas outlet of the instrument 26 for forming excited or unstable gas species.

The instrument 26 for forming excited or unstable gas species has, for the embodiment which is represented, an inner first exciting electrode 34 which is of cylindrical shape and is made of metal. It is externally coated here with a layer 36 of dielectric, for example a ceramic.

The instrument 26 further has an outer second exciting electrode 38, also of cylindrical shape. This outer second electrode 38 is formed by the concave inner face of a metal block 40 which extends longitudinally and is formed by the combination of two complementary parts 42 and 44 arranged facing and separated from one another.

Reference may be made to the two documents cited above to obtain other examples of instruments for forming excited or unstable gas species which are suitable for implementing the process according to the invention.

FIG. 2 also shows that the two exciting electrodes 34 and 38 are arranged coaxially and are separated from one another so that the second exciting electrode 38 is separated from the layer of dielectric 36 in order to bound a gas excitation chamber 46.

As mentioned above, the two constituent parts 42 and 44 of the metal block 40 are separated and bound an inlet passage 48 which is intended to admit gas into the excitation chamber 46 and is in communication with the primary gas supply source 28, and a secondary gas outlet passage 50 which is in communication with the internal space of the enclosure 30 and in front of which the object 24 to be treated is placed or brought.

Lastly, this FIG. 2 shows that the surface treatment device 22 is supplemented by a high-frequency AC high-voltage source 52 which is connected to the inner excitation electrode 34 and to the outer excitation electrode 38 with a view to forming a potential difference between them.

This device operates as follows:

The gas delivered by the primary gas supply source 28 is provided at a pressure of the order of a few bar. It is preferably delivered, using suitable known techniques, at a rate which is constant along the gas inlet passage 48.

This gas is a gas suitable for the use in question, whether it is of the inert or oxidizing or even reducing type (or alternatively a mixture of such gas types), for example air or nitrogen or even hydrogen.

The primary gas provided by the source 28 flows through the excitation chamber 46 between the inner 34 and outer 38 exciting electrodes.

In known fashion, the electrodes 34 and 36, which are provided with a potential difference by the high-voltage source 52, create a discharge in the gas or the gas mixture flowing through this chamber 46 in order, at the outlet of the excitation chamber 46, to generate a gas mixture or a gas (referred to as secondary) including unstable or excited gas species, this gas or gas mixture being here substantially free of electrically charged species.

The substantial absence of electrically charged species in the treatment atmosphere is found to be very advantageous in many cases, whether to avoid problems of static electricity in insulators, or else to avoid inducing ion bombardment and therefore an effect of sputtering of the surface, which may prove detrimental when the surface to be treated is covered with a coating which should not be degraded.

The configuration described and exemplified in the scope of FIG. 2 may be qualified as a "remote" configuration which has many advantages, including:

the fact, already pointed out, that the secondary gas used to carry out the treatment is collected as outlet gas from the instrument, and therefore after substantial recombination of the electrically charged species;

the fact that this configuration allows a clear separation between the site where the excited or unstable gas species are generated (discharge) and the site where they are used, which considerably limits the risks of polluting the electrodes because of the various releases resulting from the surface treatment operation;

lastly, the fact that, since the object to be treated is not treated within the instrument (within the inter-electrode discharge), as is the case with the device in FIG. 1, the process according to the invention benefits from much better flexibility in terms of distance and therefore volume for the objects which can be treated.

The secondary gas delivered by the gas outlet passage 50 therefore consists of a gas which is substantially free of electrically charged species and is at atmospheric pressure, or very close to atmospheric pressure. The cup 24 is then presented, by means of the conveyor system 32, in front of the outlet passage 50 so as to be in contact with the excited secondary gas.

Using the conveyor system 32, it is possible to present all of the surface of the cup 24 to contact with the excited gas.

Tests carried out on cups made of plastic with a primary gas consisting of air or nitrogen, a flow rate of the order of 10 m³/h and an electric discharge power fixed at 850 W showed that the wettability of the plastic surface was very substantially improved.

A cup treated in this way and immersed in water exhibits a continuous film of water on its surface and no droplet was substantially detected.

Figure 3:
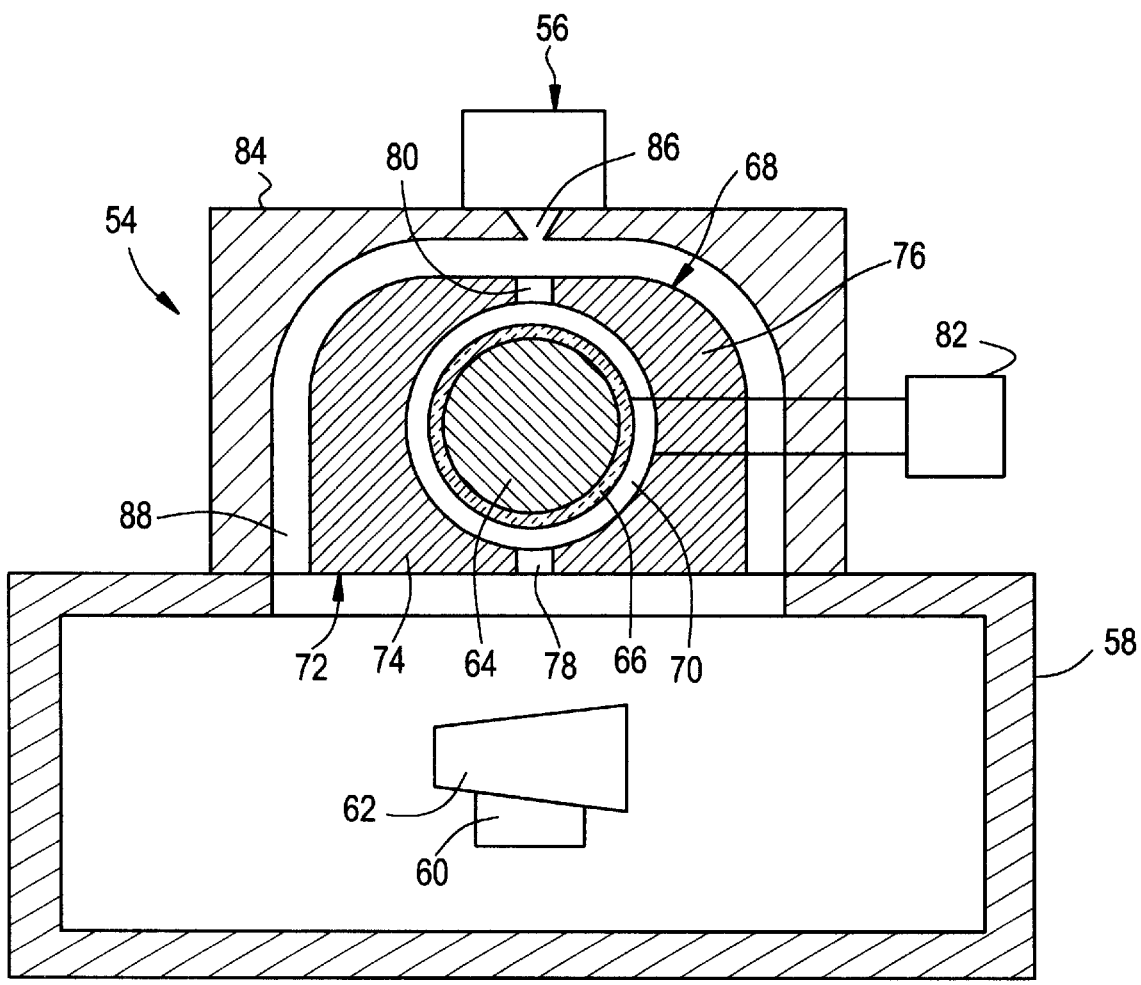
FIG. 3 is a schematic cross-sectional view of a surface treatment device according to the invention.

FIG. 3 represents a device for surface treating polymer articles according to the invention, incorporating a Venturi-effect constriction.

As in the previous illustrative embodiment described with reference to FIG. 2, this treatment device has an excitation device 54 which is supplied with gas by a primary gas source 56 and is in communication, downstream, with an enclosure 58 in which a conveyor system 60 is arranged, the conveyor system 60 being intended to convey an object 62 in front of the gas outlet 78 of the instrument 54.

This treatment device differs from the treatment device described with reference to FIG. 2 by the presence of a Venturi-effect constriction.

As before, the excitation instrument 54 has an inner first exciting electrode 64 which is coated with a layer of dielectric 66 and is of cylindrical shape. It is arranged inside an outer second exciting electrode 68, also of cylindrical shape. The two exciting electrodes 64 and 68 are arranged coaxially and, between them, bound a gas excitation chamber 70 which is in communication with the primary gas source 56.

The outer second electrode 68 is here formed by the concave inner face of a metal block 72 which extends longitudinally, is of generally convex external shape, and is formed by the combination of two complementary parts 74 and 76 arranged facing and separated from one another.

The two parts 74 and 76 are separated from one another by two passages, 78 and 80 respectively, which respectively form an inlet passage 80 for admitting gas into the excitation chamber 70, and a gas outlet passage 78 which is in communication with the enclosure 58.

The two electrodes are connected to a high-frequency AC high-voltage source 82 with a view to creating a potential difference between them.

The metal block 72 is arranged in a cage 84 and is provided with a longitudinal slot 86 which is arranged in front of the inlet passage 80 and is in communication with the gas source 56.

The slot 86 in the cage 84 has a substantially V-shaped profile which bounds a Venturi-effect constriction causing, in known fashion, an increase in the velocity of the gas delivered by the source 56 to the excitation chamber 70, as well as a corresponding reduction in the pressure of this gas.

The cage 84 and the metal block 72 are separated and bound a gas intake channel 88 which is here of curved shape and extends between the gas inlet passage 80, downstream of the Venturi-effect constriction 86, and the enclosure 58.

During operation, under the action of the Venturi-effect constriction 86, the gas undergoes a pressure reduction as mentioned above. This pressure reduction causes intake, by the Venturi effect, of the gas present in the intake channel 88, and therefore of the gas present in the enclosure 58.

It can therefore be seen that, after treating the object 62, the gas undergoes recirculation and is reinjected into the excitation chamber 70 (via the inlet passage) with a view to reexciting it, as described above with reference to FIG. 2.

According to this embodiment, the surface treatment device which has just been described allows a considerable saving on primary treatment gas since the deexcited gas present in the enclosure 58 is reinjected into the excitation chamber 70 (and therefore reused).

In the various embodiments which have been described, it will be understood that the dimensions of the object to be treated are limited only by the size of the enclosure.

It is therefore possible, using this device, to treat articles with large dimensions, in particular high volume.

Although the present invention has been described with reference to particular embodiments, it is nevertheless not limited by this but, on the contrary, may receive modifications and variants which occur to the person skilled in the art.

It will be understood, for example, that although the invention was more particularly illustrated above using Venturi-effect constrictions which are in the form of slots, other configurations may be envisaged, for example a row of orifices which may or may not be regularly spaced, or else may have a defined and controlled spacing.

What is claimed is:

1. A process for dry surface treatment of a surface of an object comprising the steps of:
    forming at a first site a secondary gas comprising excited or unstable gas species from a primary gas;
    treating the surface of an object with said secondary gas at a second site which is separate from said first site; and
    reinjecting said secondary gas used to treat the surface of an object at said second site to said first site using a venturi effect.

2. The process as claimed in claim 1, wherein said secondary gas is substantially free of electrically charged species.

3. The process as claimed in claim 1, wherein said secondary gas is at about atmospheric pressure.

4. The process as claimed in claim 3, wherein the surface of the object is treated with the secondary gas by bringing said object in front of the gas outlet of said instrument.

5. The process as claimed in claim 1, wherein said primary gas comprises at least one of an inert gasp an oxidizing gas and a reducing gas.

6. The process as claimed in claim 1, wherein said surface to be treated comprises a polymer.

7. The process as claimed in claim 1, wherein multiple surfaces of the object are treated.

8. The process as claimed in claim 1, wherein said secondary gas comprising excited or unstable gas species is formed from said primary gas in an instrument for forming excited or unstable gas species, said instrument including an outlet for the secondary gas.

9. The process as claimed in claim 1, wherein said first site for forming said secondary gas, comprising excited or unstable gas species from a primary gas, comprises a plurality of sites.

10. The process as claimed in claim 9, wherein said plurality of sites are arranged in series.

11. The process as claimed in claim 10, wherein said plurality of sites are arranged in series and wherein said object is successively brought in front of each of said plurality of sites.

12. The process as claimed in claim 11, further comprising conveying said object in front of each of said plurality of sites through an internal space defined by an enclosure which is connected in leaktight fashion to said plurality of sites.

13. The process as claimed in claim 9, wherein said plurality of sites are arranged in parallel.

14. The process as claimed in claim 13, wherein said plurality of sites are arranged in parallel over the width of the object being treated.

15. A device for dry treatment of a surface of an object comprising:
   (i) an instrument which converts a primary gas into a secondary gas comprising excited or unstable species, said instrument comprising:
      (a) a gas inlet passage in communication with a primary gas supply source;
      (b) an outlet passage for said secondary gas;
   (ii) an enclosure which defines an internal space connected in leaktight fashion to the outlet passage of said instrument or which includes said instrument;
   (iii) a venturi effect constriction arranged between the primary gas supply source and the inlet passage;
   (iv) a gas recirculation channel connecting the internal space of the enclosure to a zone downstream of the constriction which reinjects gas located in said enclosure, by a venturi effect, into the instrument.

16. The device as claimed in claim 15, further comprising a system for conveying said object inside the internal space bounded by the enclosure, which brings said surface of said object in front of said gas outlet passage.

17. The device as claimed in claim 15, wherein said instrument for forming excited or unstable gas species further comprises a high-frequency AC high-voltage source, an inner first exciting electrode of cylindrical shape, and an outer second exciting electrode which is of cylindrical shape and is provided with substantially opposite longitudinal slots which form said gas inlet and outlet passages, said first and second electrodes being arranged coaxially and bounding a gas excitation chamber, a layer of a dielectric being arranged on the surface of at least one of the electrodes, facing the other electrode.

* * * * *